United States Patent [19]

Tucker

[11] Patent Number: 5,261,719
[45] Date of Patent: Nov. 16, 1993

[54] APPARATUS FOR ATTACHING A COVER FOR AN OPEN-TOPPED VEHICLE ENCLOSURE, WITH OPTIONAL CARGO CARRIERS

[75] Inventor: David Tucker, Long Grove, Ill.

[73] Assignee: Design Automotive Trim & Accessories, Inc., Addison, Ill.

[21] Appl. No.: 875,969

[22] Filed: Apr. 29, 1992

Related U.S. Application Data

[63] Continuation-in-part of Ser. No. 657,519, Feb. 19, 1991, Pat. No. 5,152,574.

[51] Int. Cl.$^5$ ................................................ B60J 7/10
[52] U.S. Cl. ..................................................... 296/100
[58] Field of Search .................. 296/100, 98; 224/309

[56] References Cited

U.S. PATENT DOCUMENTS

| | | | |
|---|---|---|---|
| 2,357,056 | 8/1944 | Nelson | 135/7.1 |
| 2,639,751 | 5/1953 | Flaherty | 150/52 |
| 2,937,652 | 5/1960 | Zimmer, Jr. | 135/6 |
| 2,961,725 | 11/1960 | McGee | 24/73 |
| 3,172,419 | 3/1965 | Lewis | 135/6 |
| 3,373,464 | 3/1968 | Ausnit | 24/201 |
| 3,649,072 | 3/1972 | Cross | 296/137 B |
| 3,727,927 | 4/1973 | Belk | 296/137 R |
| 3,762,763 | 10/1973 | Deshores | 296/137 B |
| 3,773,380 | 11/1973 | Stockdill | 296/137 B |
| 3,936,077 | 2/1976 | Bliek | 280/423 R |
| 4,273,377 | 6/1981 | Alexander | 296/100 |
| 4,285,539 | 8/1981 | Cole | 296/105 |
| 4,394,100 | 7/1983 | Sparlich | 296/100 X |
| 4,479,677 | 10/1984 | Gulette et al. | 296/98 |
| 4,496,184 | 1/1985 | Byrd et al. | 296/100 |
| 4,547,014 | 10/1985 | Wicker | 296/100 |
| 4,607,876 | 8/1986 | Reed | 296/100 |
| 4,639,033 | 1/1987 | Wheatley et al. | 296/100 |
| 4,647,103 | 3/1987 | Walblay | 296/100 |
| 4,730,866 | 3/1988 | Nett | 296/100 |
| 4,752,095 | 6/1988 | Brady | 296/37.6 |
| 4,807,921 | 2/1989 | Champie, III et al. | 296/98 |
| 4,838,602 | 6/1989 | Nett | 296/100 |
| 4,923,240 | 5/1990 | Swanson | 296/100 |

FOREIGN PATENT DOCUMENTS 213990  3/1957  Australia .

OTHER PUBLICATIONS

Innovative Accessories Inc. Brochure (undated).
Sport masters Brochure (undated).
Extang Corp. advertisement, Sport Truck Magazine, Feb. 1990, p. 25.

*Primary Examiner*—Joseph D. Pape
*Attorney, Agent, or Firm*—Dick and Harris

[57] ABSTRACT

An apparatus for attaching a cover for an open-topped vehicle enclosure including at least one rail member resting on a top wall of the side wall of the enclosure. Mounted on the rail member is a cover attachment member engageable with a peripheral portion of a cover. The rail member is held in place on the side wall of the enclosure by clamps engageable with the rail member. Cargo support members are attachable to and supportable between opposed rail members, for carrying cargo items such as skis, bicycles, and the like.

26 Claims, 4 Drawing Sheets

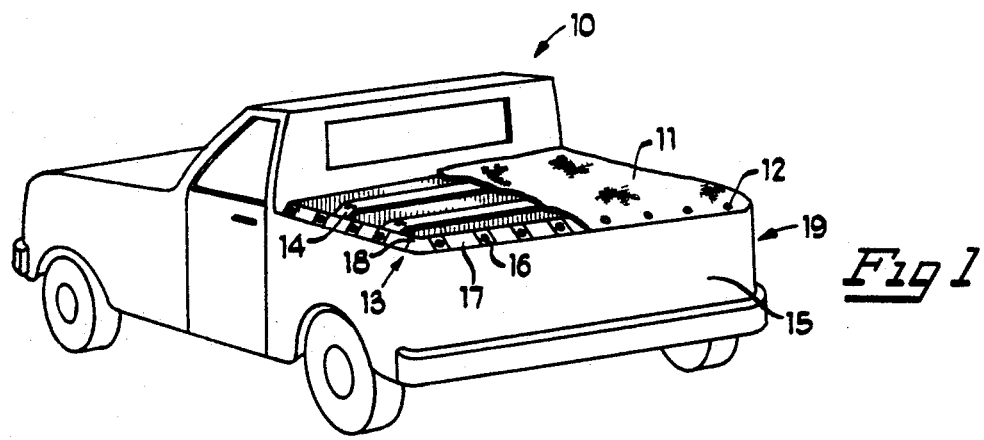
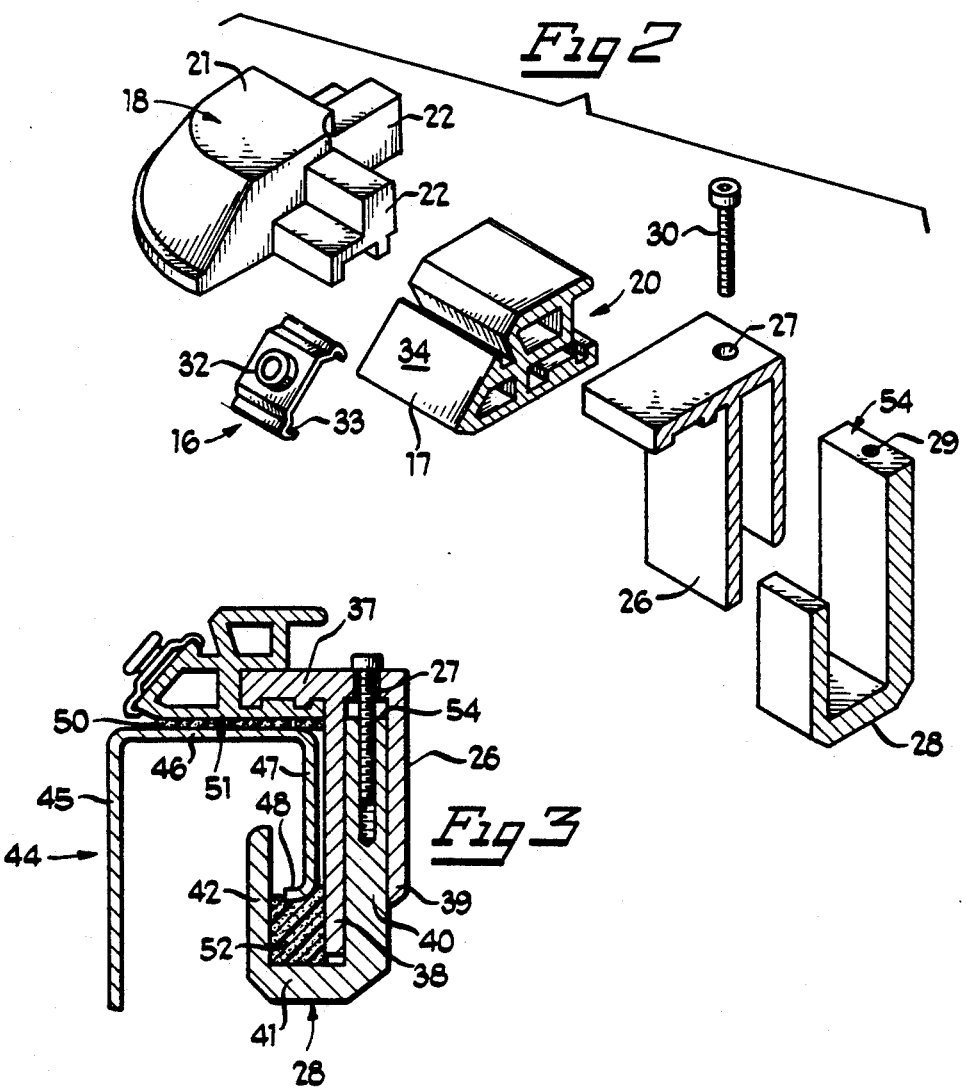

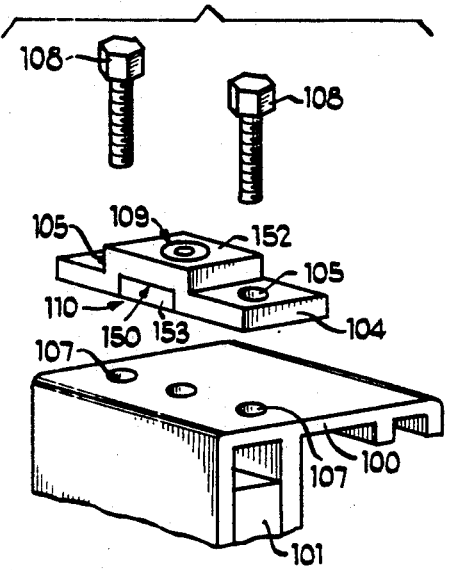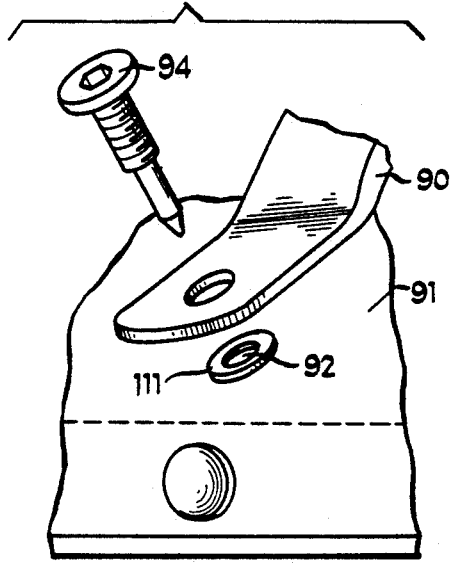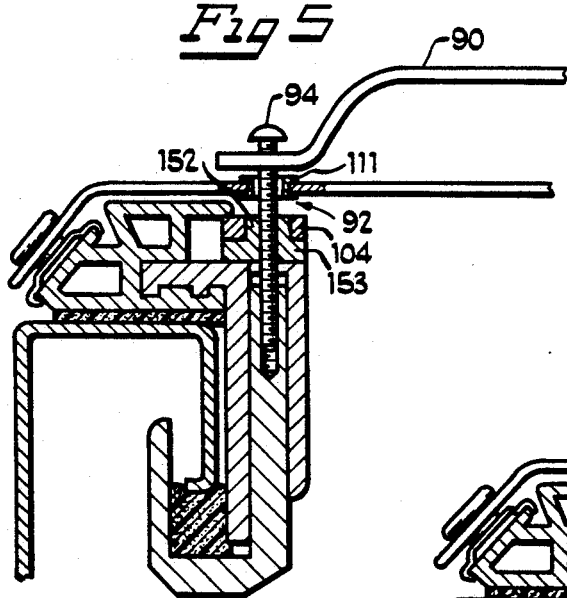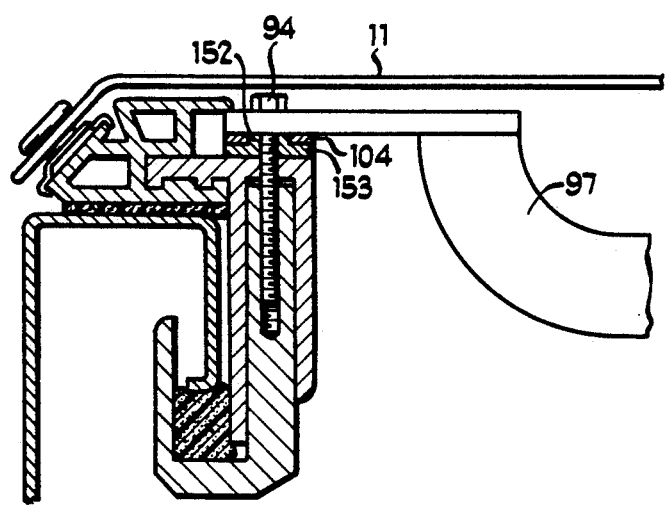

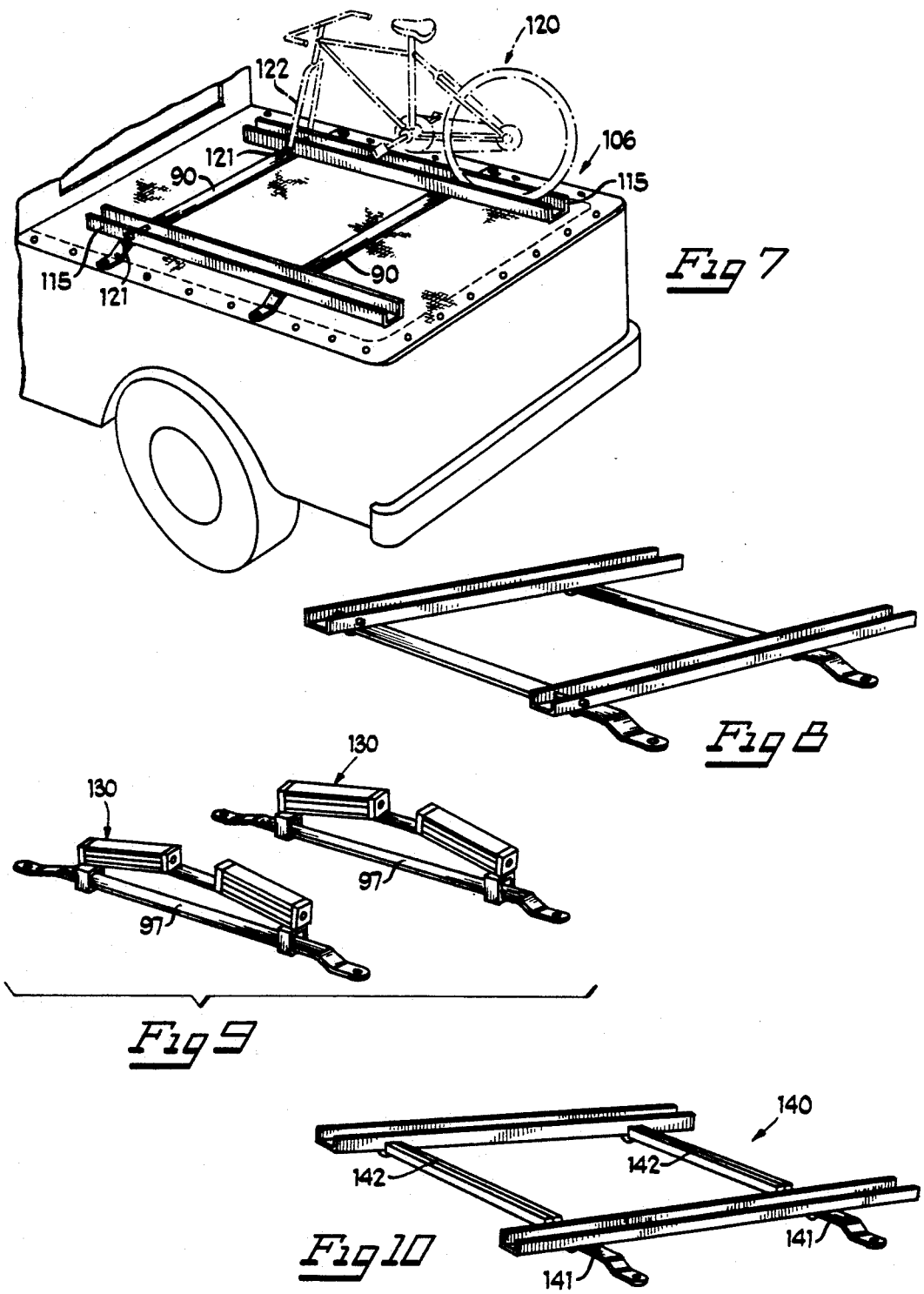

APPARATUS FOR ATTACHING A COVER FOR AN OPEN-TOPPED VEHICLE ENCLOSURE, WITH OPTIONAL CARGO CARRIERS

BACKGROUND OF THE INVENTION

This is a continuation-in-part of U.S. patent application Ser. No. 7/657,519, filed Feb. 19, 1991, now U.S. Pat. No. 5,152,574.

The present invention is directed to covers for the beds of pickup type trucks and the like, and in particular, to systems for attaching such covers to the beds of pickup type trucks and similar stowage spaces. Such covers are also employed for use on open bed trailers, and on recreational vehicles, such as small boats.

In vehicles, such as pickup trucks or small open boats, or in open bed trailers, for example, where there are areas which are generally exposed to the elements, it is often desirable to provide a cover, which will protect such areas when not in use, or when in use in inclement weather, or when visual inspection of such open areas is not desired. In order to permit maximized use of such open areas, it is also desirable to provide such a cover which is relatively quickly and substantially completely removable when so desired.

Such covers typically comprise an expanse of flexible covering material which has been treated, or is inherently resistant to the effects of the elements.

Attachment of such covering material has been accomplished, in the prior art, in a variety of ways. One such method may employ the permanent affixation of attachment members to the vehicle, for example, the bed of a pickup truck. Such a method is shown in U.S. Pat. No. 3,727,972 to Belk. In Belk, buttons are attached directly to the top edges of the truck bed side walls, by screws. The cover has eyelets formed along its periphery, to slip around and engage the eyelets. Rods are sewn into the periphery of the cover, to the outside of the eyelets, to take the load created by the tension of the cover off of the outer portions of the eyelets. Handles attached to the rods permit the user to pull the cover over the eyelets and into place.

The drilling of permanent holes is necessary to the use of such a cover, which may not be desired, and should changes in the spacing of the eyelets due to shrinkage or other reasons occur, alignment of the buttons with the eyelets may be difficult or impossible. A similar cover is shown in U.S. Pat. No. 4,479,677 to Gulette et al. In Gulette et al., the cover is rolled onto a reel, which is housed in a box at one end of the truck bed. Rails are permanently attached to the side walls of the truck bed. The rails carry snap members which correspond to snap members affixed to the cover. Such a cover, by its nature, involves drilling into the body of the truck, which damage may not be desired. Further, the snap elements are rigidly fixed within the rails, and so cannot accommodate variations in the cover which may be induced by temperature and moisture, or aging of the cover.

Another type of cover is shown in U.S. Pat. No. 4,639,033 to Wheatley et al. In Wheatley et al., a number of flat flanges are clamped onto the tops of the side walls of a truck bed. The flanges extend along the length of the side walls and include outwardly projecting edges. A cover has J-shaped fasteners attached to its edges. Each fastener includes a lip which is configured to engage the outwardly projecting edge of the flange.

The apparatus of Wheatley et al. has several drawbacks, however. Variation in the dimensions of the cover can make alignment and engagement of the fasteners upon the edges of the flanges difficult. Further, the clamps used to attach the flanges grip the inner, downward-extending portions of the side walls with a horizontal gripping action, which requires that a bolt directly contact the side wall, which can lead to scratching, denting or other damage to the side wall. In addition, the position of the bolt is to the inside and underneath of the top edge of the side wall, which tends to made installation and removal of the clamps awkward and cumbersome. In addition, since the clamping action takes place in the horizontal plane, the clamping elements may be subject to horizontal stresses produced by the cover itself and may work loose over time.

Still another cover apparatus is found in U.S. Pat. No. 4,730,866 to Nett. In Nett, a plurality of rails are placed atop the side walls of a truck bed, and held in place by horizontally-acting fulcrum clamps. A number of snap fastener elements are slidably received by slots extending the length of the rails. A significant drawback of the Nett apparatus is that the clamps extend for a considerable distance below the top edges of the side walls, and must be considerably taller than the inner lip of the side wall. The clamps must contact the inner lip of the side wall, the top surface, and the outer wall of the side wall, in order to function. Further, the clamps are bolted to the rail members and place the rail members under twisting stresses and localized compression forces which can lead to the ultimate deformation of the rails, and slippage of the clamps. The clamps also subject the inner rim, top edges and outer walls to considerable localized twisting stresses which can lead to deformation of the those portions of the truck bed side walls. Still another drawback of this apparatus is that should it be desired to remove the snaps from the rails, as the snaps must be slidingly removed, at least one corner piece must be removed to permit removal of the snaps. Also, as with Wheatley et al., since the clamping action takes place in the same direction as the tension of the cover, the clamps may tend to work loose.

Accordingly, it is an object of the invention to provide an apparatus for attaching a removable cover which can accommodate changes in the dimensions of the cover and still function satisfactorily.

Yet another object of the invention is to provide an apparatus for attaching a removable cover which utilizes rails which can be removably clamped onto the side walls of a truck bed, without marring the material of the side walls.

A further object of the invention is to provide such an apparatus for attaching a removable cover employing removable rails which may be readily and positively secured, and in which the clamping action takes place along a plane perpendicular to the plane of the cover.

These and other objects of the invention will become apparent in light of the present Specification, Claims and Drawings.

SUMMARY OF THE INVENTION

The present invention comprises an apparatus for attaching a cover for an open-topped vehicle enclosure, such as a pickup truck bed, the enclosure having a plurality of side walls, with each side wall including at least an outer wall and a top wall which extends substantially horizontally and inwardly from the outer wall.

At least one rail member is provided, which includes a bottom surface configured to rest on an upper surface of the top wall, and an outwardly-facing inclined side surface having an upper edge and a lower edge.

A plurality of discrete, separate cover attachment members are removably affixable to the at least one rail member by operable gripping engagement with the upper and lower edges of the outwardly-facing inclined side surface, so as to substantially span the outwardly-facing inclined side surface, for engaging a peripheral portion of a cover member. Clamping means are operably engageable with the side wall and the at least one rail member so as to grasp or release the side wall to clamp the at least one rail member to the top wall of the side wall.

In a preferred embodiment of the invention, at least two rail members are provided, and are arranged in substantially parallel relation to each other on opposite sides of the open-topped vehicle enclosure. Means for carrying cargo items, operably supported by the at least two rail members, may be removably attached to the at least two rail members.

The means for carrying cargo items preferably comprise at least two support members, each having two ends, which are operably arranged to extend transversely between the at least two rail members. The at least two support members are operably positionable in substantially parallel relationship to each other, and are further operably positionable in a plurality of spaced positions relative to each other.

Means for attaching the at least two support members comprise further clamping means operably engageable with the at least two rail members. Adapter means are operably mountable on the further clamping means, and are configured to releasably engage the ends of the at least two support members.

In an embodiment of the invention, each of the at least two support members is an elongated upwardly convex-bowed bar member which extends through the cover at positions adjacent its ends. The bar member thus extends above the cover for substantially all of its length. In an alternative embodiment of the invention, each support member is an elongated upwardly concave-bowed bar member extending beneath the cover. In still another alternative embodiment of the invention, each support member is an elongated, upwardly convex-bowed bar member extending beneath the cover to maintain the cover in an upwardly convex configuration.

BRIEF DESCRIPTION OF THE DRAWINGS

FIG. 1 is a perspective view of a pickup truck, showing a cover, in fragmented view, in place on the truck bed, and further showing the system for mounting the cover, according to the preferred embodiment of the invention;

FIG. 2 is a perspective exploded view of some of the components of the system for mounting a cover;

FIG. 3 is a side elevation, in section, of a rail member, clamped into place on the side wall of a truck bed;

FIG. 4A is a fragmentary perspective view of an accessory clamp and accessory adapter;

FIG. 4B is a fragmentary perspective view of an end of an above-cover accessory support bar, showing the grommet in the cover;

FIG. 5 is a side elevation, partly in section, showing an end of an above-cover accessory support bar;

FIG. 6 is a side elevation, partly in section, showing an end of a below-cover accessory bar;

FIG. 7 is a perspective view of a pickup truck bed with a cover in place, showing an above-cover accessory bicycle rack, according to the present invention;

FIG. 8 is a perspective view of the accessory bicycle rack according to FIG. 7;

FIG. 9 is a perspective view of above-cover accessory support bars with ski-holding clamps provided thereon, according to the present invention;

FIG. 10 is a perspective view of an above-cover general utility cargo rack, according to the present invention;

DETAILED DESCRIPTION OF THE DRAWINGS

Figure 11:
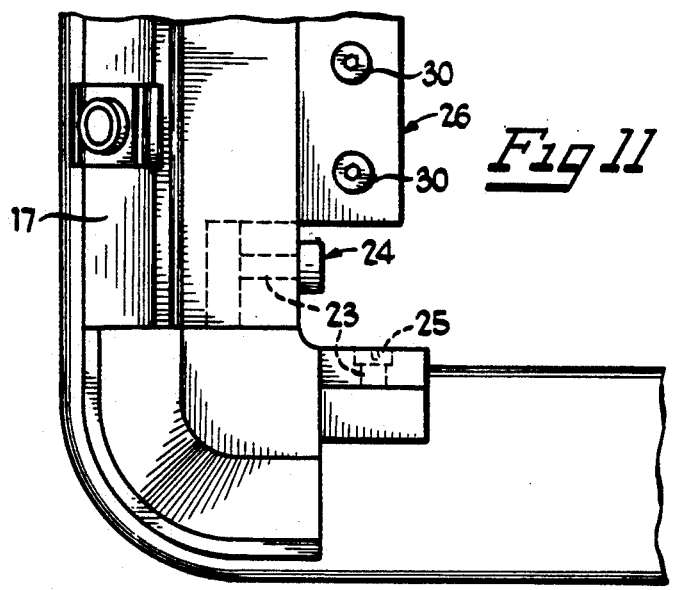
FIG. 11 is a top plan view of a corner assembly for the rail system of the present invention.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

A pickup truck 10, is shown in FIG. 1, having a truck bed 19 which is enclosed by cover 11. Cover 11 comprises a sheet, either of a single piece, or a number of panels, of suitable durable, and water-repellent material, such as canvas, or heavy plastic.

A plurality of female snap members 12 are attached along the periphery of cover 11. Female snap members 12 are received by male snap members 16 of rail system 13, according to the present invention. Male snap members 16 are removable from the outer surface of rail system 13 so as to enable repositioning thereof along the length of rail members 17, and subsequent alignment with the corresponding female snap members 12. Rail system 13 further includes corner members 18. Cover 11 is further supported by bows 14, so as to keep the central region of cover 11 elevated to promote the runoff of rainwater or other moisture.

In FIG. 2, an exploded view of the elements comprising the rail system is provided. Rail member 17, of which a fragment is shown, comprises, in a preferred embodiment of the invention, a single piece of extruded material, which may be aluminum, steel, or even strong plastic, which extends substantially the entire length of the particular side of truck bed 19 on which it is to be placed.

Rail member 17 is formed to include assembly channel 20, which is shown in this embodiment as having a substantially L-shape, though other configurations may be employed. Corner members 18 are placed at the ends of rail members 17, to join perpendicularly extending rail members 17. Each corner member 18 includes central portion 21 and attachment members 22. Attachment members 22 each have a cross-section substantially corresponding to the cross-section of assembly channel 20, to provide for a close fit.

Figure 12:
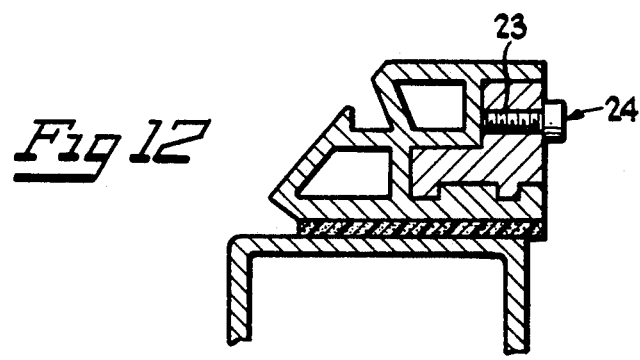
FIG. 12 is a side elevation, partly in section, taken along line 12—12 of FIG. 11.

To further secure corner member 18 to rail member 17, blind bores 23 are placed in the "inside" surfaces of attachment elements 22, as shown in FIGS. 11 and 12.

Thumbscrews 24, or set screws 25, the selective use of which is explained in more detail later, have a larger diameter that bores 23, and cause attachment members 22 to expand, when they are screwed in, creating increased friction between attachment members 22 and the inside surfaces of assembly channels 20.

In the preferred embodiment of the invention, the rail member 17, which spans across and above tailgate 15 of truck bed 19, is not attached to tail gate 15, but only suspended at its ends by corner members 18, so that tailgate 15 may be freely raised and lowered. Also, the rear corner members 18, or at least the left rear corner member 18, is mounted as seen in FIG. 11, with a thumbscrew 24 used on the side wall side of central portion 21 and a set screw 25 used on the tailgate side. The right rear corner member, of course, would be arranged as a mirror image of FIG. 11. Should it be desired to load an article taller than the tailgate-crossing rail member will permit, by loosening thumbscrews 24, the two rear positioned corner members 18 and tailgate-crossing rail member 17 may be readily removed. Thumbscrews 24 are utilized so as to facilitate removal of tailgate crossing rail member 17 without the need for tools.

The two forward corner members 18 preferably are secured on both sides by thumbscrews 24. In a preferred embodiment of the invention, the front hem of cover 11 is not secured by snap members. Instead, the front hem of cover 11 is formed as an elongated loop, extending along the length of the hem, to receive an elongated rod member. Front rail member 17 then is configured to slidingly receive at one or the other end, the front hem, with cover 11 then extending through a longitudinal aperture in front rail member 17. Once corner members 18 are in place, the elongated rod member prevents the release of the front hem by front rail member 17, in a known manner. Accordingly, front corner members 18 are held in place with thumbscrews 24, to facilitate rapid installation, removal and replacement of cover 11.

In an alternative embodiment of the invention, cover 11 is secured by snap members along all four edges of cover 11, and along front, tailgate-crossing, and side rail members 17.

Returning to FIG. 2, also shown are upper clamp member 26 having bolt aperture 27, lower clamp member 28 having threaded bore 29, and clamp bolt 30. Upper clamp member 26 and lower clamp member 28 are shown in fragment, in that in the preferred embodiment of the invention, each is sufficiently wide to be provided with two or more bolt apertures 27, and threaded bores 29, respectively, as seen in FIG. 11. The operation of upper clamp member 26 and lower clamp member 28 is discussed later.

Male snap member 16 includes male snap element 32, which is affixed to clip 33. Clip 33 is advantageously configured to be "snapped" onto clip surface 34, which extends along the entire length of each rail member 17. Clip 33 is further configured to tightly grip clip surface 34, once snapped into a desired position, but may be "snapped" off of clip surface 34, if so desired. Male snap members may thus be repositioned along the length of rail member 17 in order to accommodate covers 11 which have differently arranged female snap members 12. Additionally, changes in the configuration of a particular cover 11, due to stretching, or shrinkage or the like may also be accommodated.

As can be seen in FIG. 2, and in detail in FIG. 3, upper clamp member 26 includes outwardly extending arm 37, which is configured to slidingly fit closely within at least a lower portion of assembly channel 20 of rail member 17. Upper clamp member 26 further includes longer downwardly extending wall 38 and and shorter downwardly extending wall 39, which, in the preferred embodiment of the invention, are parallel and spaced apart just enough to snugly receive long upwardly extending wall 40 of lower clamp member 28. Bolt aperture 27 is positioned to extend through upper clamp member 26, between walls 38 and 39. Lower clamp member 28 also includes bottom horizontal wall 41 and short upwardly extending wall 42.

A section of side wall 44 of a truck bed 19, including outer wall 45 and top edge 46 of the bed of truck 10 are shown in cross section in FIG. 3. Inner wall 47 extends downwardly from top edge 46, and faces the "inside" of truck bed 19. Inner wall 47 may also include lip 48, turned away form the inside of truck bed 19. To attach rail system 13 to side wall 44 of truck bed 19, arm 37 of upper clamp member 26 is inserted into assembly channel 20 of rail member 17. Rail member 17 is then placed on top edge 46 of side wall 44. To protect top edge 46 from damage from rail member 17, gasket member 50, which may be fabricated from foam rubber, or other suitable resilient material, is provided along the length of the bottom surface 51 of rail member 17.

Once rail member 17 is in place, lower clamp member 28 is fitted to upper clamp member 26, with wall 40 of lower clamp member 28 fitting snugly between walls 38 and 39 of upper clamp member 26. Clamp bolt 30 is placed in bolt bore 27, started in threaded bore 29 and tightened down to draw bottom wall 41 up toward top edge 46 of side wall 44, along a substantially vertical axis. Isolator element 52, preferably fabricated of a resilient material, is placed in lower clamp member 28, in the space between short wall 42 and wall 38 of upper clamp member 26, to prevent damage to lip 48 and inner wall 47 of side wall 44, and also to enhance the grip of lower clamp member 28 upon lip 48 and inner wall 47, by deforming slightly and conforming to the respective surfaces of lip 48 and inner wall 47.

Wall 40 of lower clamp member 28, in the preferred embodiment of the invention, must be short enough, with respect to walls 38 and 39, and threaded bore 29 and clamp bolt 30 long enough, so as to permit upper clamp member 26 and lower clamp member 28 to be drawn together and tightly grip top edge 44, inner wall 47 and lip 48, without top surface 54 of wall 40 abutting upper clamp member 28.

Once tightened down, upper clamp member 26 and lower clamp member 28 should grip side wall 44 tightly, but not rigidly, as gasket member 50 and isolator element 52 will permit some movement of the clamp members, and rail member 17, relative to side wall 44, as may be necessary to accommodate minor fluctuations in the tension of cover 11, while in place, as may be caused by expansion or contraction due to heat, cold, excess moisture, or drying, among other conditions As mentioned previously, to connect rail members 17, which are positioned on perpendicular walls of truck bed 19, corner members 18 are provided, the details of which are shown in FIGS. 11 and 12. Corner members 18, in the preferred embodiment of the invention, are not clamped to the side walls of truck bed 19, as are rail members 17. Instead, corner members 18 may simply rest atop top edge 46. Although in the preferred embodiment, forward corner members 18 also rest atop top edge 46, for purposes described elsewhere, in an alternative embodiment, they might, if desired, be simply bolted directly to the side walls, by bolts extending through central portion 21 into top edge 46 of side wall 44 (not shown). In either embodiment, as with rail members 17, further gasket members are placed along the bottom surface of central portion 21, to protect the top surfaces of the side walls from damage. As previously discussed, FIG. 11 indicates the preferred positioning of a left rear corner member 18, relative to rail member 17, and one upper clamp member 26. The clamps may be positioned as desired along the lengths of rail members 17, in order to securely attach rail members 17 to side walls 44.

As indicated earlier, bows 14 may be used to elevate the central portions of cover 11, to direct the run-off of moisture out over the sides of truck bed 19. Such bows preferably comprise, in a preferred embodiment of the invention, rigid tubular extrusions of aluminum, which have flattened ends provided with slots opening upon the actual end faces. The slotted ends are provided to align with threaded openings either on the clamps or, alternatively, on rail members 17 directly, with thumbscrews then being used to secure the ends of the bows. Alternatively, the bows may comprise thin rectangular slats of strong, but flexible material, such as wood, heavy plastic, or thin steel or aluminum. The ends of such bows might be received by the assembly channels of opposed rail members 17, or by appropriate slots or projections, in some or all of upper clamping members 26.

Once rail members 17 are in place, cover 11 may be draped over bows 14, so that female snap members 12, which are placed along the periphery of cover 11, are positioned over surfaces 34 of rail members 17. Cover 11 should be constructed so as to need to be slightly stretched to attain the just-described positioning. Male snap members 16 can then be positioned beneath respective female snap members 12, and "snapped" into place on rail members 17. Once so positioned, male snap members 16 fit about surfaces 34 tightly enough so as not to slide along rail members 17. In this embodiment of the invention, where male snap members 16 are not configured so as to provide an interference or other tight fit, sliding of male snap members 16 along rail members 17 will be enabled. Should some change occur in the configuration of cover 11 due to weathering, shrinkage, or fatigue stretching, for example, which prevent female snap members 12 from engaging male snap elements 32, male snap members 16 may be pried off of the particular rail member 17, and repositioned to accommodate the changed configuration of cover 11.

Figure 13:
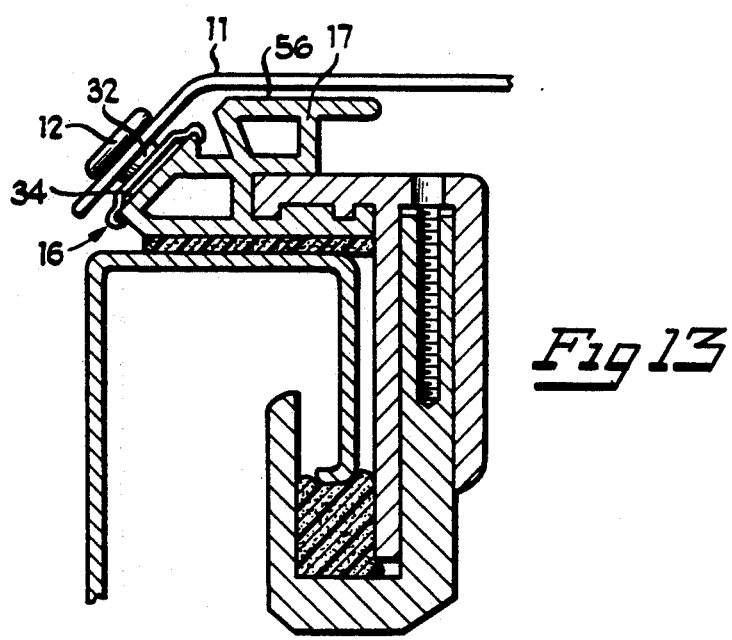
FIG. 13 is a side elevation, partly in section, showing a rail held in place by a clamp according to the present invention.

When cover 11 is in place, female snap members 12 cover male snap elements 32. Cover 11 is drawn and held closely over the top surface 56 of rail members 17. Surfaces 34 of rail members 17, are angled downwardly and outwardly from top surface 56, to facilitate stretching of cover 11 to bring female snap members 12 and male snap elements 32 into alignment. The amount of tension in cover 11 should be enough to maintain cover 11 taut, but should not be so great as to promote the spontaneous "popping off" of female snap members 12 from male snap elements 32. FIG. 13 illustrates a portion of cover 11, with female snap member 12 in position and snapped onto male snap element 32, with cover 11 extending over top surface 56.

Although a vehicle owner may wish to have a cover, such as described, in place at all possible times, it is still desirable to enable the vehicle owner to derive maximum utility from the vehicle. Accessory bars, mounted on the rail members 17, would help accomplish such maximum utilization. Such accessory bars may form part of bicycle or ski racks, or racks for externally carried stowage, for example.

An advantageous method of attaching accessory bars, such as accessory bar 90, as seen in FIGS. 4A, 4B, 5 and 6, is to employ a modification of the clamp configuration, previously discussed and shown in FIGS. 2 and 3. In particular, as shown in FIGS. 4a and 4b, upper accessory clamp member 100 and lower accessory clamp member 101 operate in substantially the same manner as upper clamp member 26 and lower clamp member 28 referred to hereinabove. Accessory adapter member 104 is provided with bolt holes 105, which align with bolt holes 107 in upper accessory clamp member 100, and threaded bores (not shown) in lower accessory clamp member 101, so that bolts 108 both tighten upper and lower accessory clamp members 100 and 101 together and affix accessory adapter member 104. Accessory adapter member 104 is also provided with a central non-threaded aperture 109, below which is arranged a substantially rectangular slot 150. Into slot 150 and aperture 109 is placed nut insert 110, which is formed with a cylindrical internally threaded portion 152 and a rectangular flange 153, at one end of cylindrical internally threaded portion 152. In a preferred embodiment of the invention, adapter member 104 is fabricated from aluminum. Although a threaded bore might be placed in adapter member 104 directly, a nut insert, such as nut insert 110, may be provided, which may be fabricated from a stronger material, such as steel. Once nut insert 110 is positioned within slot 150, it is constrained from rotation, so that a bolt, such as bolt 94, when inserted and rotated, is drawn into and toward nut insert 110.

Above-cover accessory bar 90 is seen in FIGS. 4B and 5, mounted in place on upper accessory clamp member 100, held in place by bolt 94 which is arranged between or to the sides of bolts 30 (not shown) which hold upper accessory clamp member 100 and lower accessory clamp member 101 together. Cover 91 is provided with apertures 92, through which bolts 94 pass. Preferably, apertures 92 are surrounded by grommets 111, which are closely fitted to the diameters of bolts 94 to prevent the inward leakage of moisture, dirt, and the like.

An above-cover configuration may be appropriate for carrying skis or larger or more awkward items, such as bicycles. In FIG. 7, an above-cover bicycle carrying configuration 106 is shown, in which bars 90 are connected by channel members 115, in which the rear wheel of a bicycle 120 (shown in phantom and not comprising part of the present invention) may be placed. Typically, when bicycles are transported on automobile racks, the front wheel, being readily removable as a security feature, is removed. Channel members 115 of bicycle carrying configuration 106 are further advantageously provided with pins 121 which are configured to accommodate the ends of fork 122 of bicycle 120. Bicycle 120 may be further secured to channel member 115 in a known manner using resilient straps and/or clamp means.

For carrying items below an installed cover, for either protection from the elements or to keep such items out of sight, below-cover accessory bar 97 may be used, as shown in FIG. 6. An uninterrupted cover, such as cover 11, previously described, may be employed. As in the previous embodiment, support 97 is mounted atop adapter member 104 which is in turn atop upper accessory clamp member 100 and held in place by bolt 94. Accessory bar 97 is suitable for carrying elongated items, such as skis. FIG. 9 shows accessory bars 97 which have been supplied with clamping devices 130. To transport skis, accessory bars 97 are arranged in substantially parallel relation to each other, at an appropriate distance, so that when the skis are clamped, adjacent their ends, within clamping devices 130, in a known manner, the skis will not be subjected to excessive vibration. Clamping devices 130 are shown in FIG. 9 "above" bars 97; when used in a below-cover mode, they may be simply inverted about bars 97, so that the skis will be slung below the bars.

In an alternative embodiment, above-cover bars 90 may be used, with clamping devices 130 being positioned on the "upper" sides of the accessory bars, in the orientation shown in FIG. 9.

Yet another accessory configuration 140, for general cargo or luggage, is shown in FIG. 10. General configuration 140 can be a modification of bicycle configuration 106, wherein bars 141 are further provided with low- or substantially non-friction skids 142, to facilitate loading and positioning of cargo items without damaging them. Once in place the cargo items may be secured in any known manner, utilizing, for example, straps, rope or "bungee" cords.

While in the preferred embodiment of the invention, it is contemplated that clamping of rail members 17 to side walls 44 is done substantially only by upper clamp members 26 and lower clamp members 28, while the supporting of accessory bars 90, 97 is done substantially only by upper accessory clamp members 100 and lower accessory clamp members 101, together with adapter members 104, in an alternative embodiment of the invention, it is contemplated that both duties of supporting the accessory bars and clamping rail members can be satisfactorily done in a rail system having only upper accessory clamp members 100 and lower accessory clamp members 101, together with adapter members 104.

The foregoing description and drawings merely explain and illustrate the invention and the invention is not limited thereto except insofar as the appended claims are so limited, as those skilled in the art who have the disclosure before them will be able to make modifications and variations therein, without departing from the scope of the invention.

What is claimed is:

1. An apparatus for attaching a cover for an open-topped vehicle enclosure, said enclosure having a plurality of side walls, each side wall including at least an outer wall portion and a top wall portion extending substantially horizontally and inwardly from said outer wall portion, said apparatus for attaching a cover comprising:
    at least one rail member including
        a bottom surface configured to rest on an upper surface of said top wall portion,
        an outwardly-facing inclined side surface having upper and lower edges, and
        a longitudinally extending protective shelf arranged substantially parallel and adjacent to said upper edge of said outwardly-facing inclined side surface;
    a plurality of discrete, separate cover attachment members, removably affixed to one or more of said at least one rail member by operably gripping engagement with said upper and lower edges of said outwardly-facing inclined side surface, so as to substantially span said outwardly-facing inclined surface, for engaging a peripheral portion of a cover member, said protective shelf being operably disposed for substantially shielding said upper edge of said outwardly-facing inclined side surface, to substantially preclude potentially damaging and unsightly protrusion of said attachment members from under said cover member adjacent said peripheral portion of same, while further serving, to facilitate prevention of undesired removal of said cover attachment members; and
    clamping means operably engageable with said side wall and said at least one rail member, so as to releasably clamp said at least one rail member onto said top wall of said side wall.

2. The apparatus according to claim 1 wherein said apparatus further comprises:
    at least two rail members operably disposed in substantially parallel relation to each other upon opposite sides of said open-topped vehicle enclosure;
    means for carrying cargo items, operably supported transversely between said at least two rail members; and
    means for removably attaching said means for carrying cargo items to said at least two rail members.

3. The apparatus according to claim 2, wherein said means for carrying cargo items comprises:
    at least two support members, each having two ends, operably arranged to extend transversely between said at least two rail members, said at least two support members being operably positionable in substantially parallel relationship to each other, said at least two support members being further operably positionable in a plurality of spaced positions relative to each other.

4. The apparatus according to claim 3, wherein said means for removably attaching said at least two support members comprise:
    further clamping means operably engageable with said at least two rail members; and
    adapter means operably mountable upon said further clamping means, and further operably configured to be releasably engaged with said ends of said at least two support members.

5. The apparatus according to claim 3 wherein each of said at least two support members comprises:
    an elongated upwardly convex-bowed bar member extending through said cover at positions adjacent its ends, and extending above said cover for substantially all of its length.

6. The apparatus according to claim 3 wherein each of said at least two support members comprises:
    an elongated, upwardly concave-bowed bar member extending entirely beneath said cover for all of its length.

7. The apparatus according to claim 3 wherein each of said at least two support members comprises:
    an elongated, upwardly convex-bowed bar member extending entirely beneath said cover to maintain said cover in an upwardly convex configuration.

8. The apparatus for attaching a cover according to claim 1, further comprising:
    cushion means operably disposed along said bottom surface of said at least one rail member to preclude damage to said top wall of said side wall when said clamping means grip said side wall.

9. The apparatus for attaching a cover according to claim 1, having at least two rail members, further comprising:
at least one corner member configured to connect said rail members in perpendicular relationship to each other.

10. The apparatus for attaching a cover according to claim 1, wherein said at least one cover attachment member comprises:
a clip member interlockingly and removably engageable with said at least one rail member; and
a male snap member affixed to said clip member, said male snap member being separably engageable with any of a plurality of female snap members arranged along a peripheral region of said cover.

11. The apparatus for attaching a cover according to claim 9, further comprising:
at least two attachment members emanating from a central portion of said at least one corner member, perpendicularly relative to each other,
each of said at least two attachment members being configured to be received within any of said at least two rail members.

12. The apparatus for attaching a cover according to claim 11, further comprising:
means for affixing said at least two rail members to said at least one corner member, when each of said at least two attachment members have been received by said each said at least two rail members.

13. An apparatus for attaching a cover for an open-topped vehicle enclosure, said enclosure having a plurality of side walls, each side wall including at least an outer wall portion and a top wall portion extending substantially horizontally and inwardly from said outer wall portion, said apparatus for attaching a cover comprising:
at least two rail members operably arranged in substantially parallel relationship upon opposite sides of said vehicle enclosure, on the top wall portion of said side walls thereof,
each of said at least two rail members including a longitudinally extending protective shelf surface;
a plurality of discrete, separate attachment members, removably affixable to two or more of said at least two rail members for engaging a peripheral portion of a cover member, said attachment members being affixable substantially parallel and immediately adjacent to said protective shelf surface, so as to be substantially precluded from potentially damaging and unsightly protrusion of said attachment members from under said cove member adjacent said peripheral portion of same, while further serving, to prevent undesired removal of said attachment members;
a plurality of clamping members operably engageable with said side wall and said at least two rail members so as to grasp or release said side wall to releasably clamp said at least two rail members onto said top wall portion of said side wall;
means for carrying cargo items, operably supported by and between said at least two rail members, upon said top wall portion of said side walls.

14. The apparatus according to claim 13, wherein said means for carrying cargo items comprises:
at least two support bars, each having two ends, operably supported, in substantially parallel relation, substantially perpendicular to said at least two rail members, by said clamping members.

15. The apparatus according to claim 14, further comprising:
adapter means, operably mountable upon said clamping members, for receiving and supporting said ends of said support bars.

16. The apparatus according to claim 13, wherein said means for carrying cargo items comprises:
further clamping members operably engageable with said side wall and said at least two rail members; and
at least two support bars, each having two ends, operably supported, in substantially parallel relation, substantially perpendicular to said at least two rail members, by said further clamping members.

17. The apparatus according to claim 16, further comprising:
adapter means, operably mountable upon said further clamping members, for receiving and supporting said ends of said support bars.

18. An apparatus for attaching a cover for an open-topped vehicle enclosure, said enclosure having a plurality of side walls, each side wall including at least an outer wall portion and a top wall portion extending substantially horizontally and inwardly from said outer wall portion, said apparatus for attaching a cover comprising:
at least two rail members operably disposed in substantially parallel relation to each other upon opposite sides of said open-topped vehicle enclosure, including
a bottom surface configured to rest on an upper surface of said top wall portion,
an outwardly-facing and inclined side surface having upper and lower edges;
a plurality of discrete, separate cover attachment members, removably affixable to said at least one rail member by operably gripping engagement with said upper and lower edges of said outwardly-facing inclined side surface, so as to substantially span said outwardly-facing inclined surface, for engaging a peripheral portion of a cover member;
clamping means operably engageable with said side wall and said at least one rail member so as to grasp or release said side wall to clamp said at least one rail member onto said top wall of said side wall;
means for carrying cargo items, operably supported transversely between said at least two rail members; and
means for removably attaching said means for carrying cargo items to said at least two rail members.

19. The apparatus to claim 18, wherein said means for carrying cargo items comprises:
at least two support members, each having two ends, operably arranged to extend transversely between said at least two rail members, said at least two support members being operably positionable in substantially parallel relationship to each other, said at least two support members being further operably positionable in a plurality of spaced positions relative to each other.

20. The apparatus according to claim 19, wherein said means for removably attaching said at least two support members comprise:
further clamping means operably engageable with said at least two rail members; and adapter means operably mounted upon said further clamping means, and further operably configured to be releasably engaged with said ends of said at least two support members.

21. The apparatus according to claim 19 wherein each of said at least two support members comprises:
an elongated upwardly convex-bowed bar member extending through said cover at positions adjacent its ends, and extending above said cover for substantially all of its length.

22. The apparatus according to claim 19 wherein each of said at least two support members comprises:
an elongated, upwardly concave-bowed bar member extending entirely beneath said cover for all of its length.

23. The apparatus according to claim 19 wherein each of said at least two support members comprises:
an elongated, upwardly convex-bowed bar member extending entirely beneath said cover to maintain said cover in an upwardly convex configuration.

24. An apparatus for attaching a cover for an open-topped vehicle enclosure, said enclosure having a plurality of side walls, each side wall including at least an outer wall portion and a top wall portion extending substantially horizontally and inwardly from said outer wall portion, said apparatus for attaching a cover comprising:
at least two rail members, each including
a bottom surface configured to rest on an upper surface of said top wall portion,
an outwardly-facing inclined side surface having upper and lower edges;
a plurality of discrete, separate cover attachment members, removably affixable to two or more of said at least two rail members by operably gripping engagement with said upper and lower edges of said outwardly-facing inclined surface, so as to substantially span said outwardly-facing inclined surface, for engaging a peripheral portion of a cover member;
clamping means operably engageable with said side wall and one or more of said at least two rail members so as to releasably clamp said one or more of said at least two rail members onto said top wall of said side wall;
at least one cover member configured to connect adjacently positioned ones of said rail members in perpendicular relationship to each other;
at least two attachment members emanating from a central portion of said at least one corner member, perpendicularly relative to each other,
each of said at least two attachment members being configured to be received within any of said at least two rail members; and
means for affixing said at least two rail members to said at least one corner member, when each of said at least two attachment members have been received by said at least two rail members.

25. An apparatus for attaching a cover for an open topped vehicle enclosure, said enclosure having a plurality of side walls, each side wall including at least an outer wall portion and a top wall portion extending substantially horizontally and inwardly from said outer wall portion, said apparatus for attaching a cover comprising:
at least two rail members operably arranged in substantially parallel relationship upon opposite sides of said vehicle enclosure;
a plurality of discrete, separate attachment members, removably affixable to any of said at least two rail members for engaging a peripheral portion of a cover member;
a plurality of clamping members operably engageable with said side wall and said at least two rail members so as to grasp or release said side wall to clamp said at least two rail members onto said top wall portion of said side wall; and
at least two support bars, each having two ends, operably supported, in substantially parallel relation, substantially perpendicular to said at least two rail members, by said clamping members;
adapter means, operably mountable upon said clamping members, for receiving and supporting said ends of said support bars.

26. An apparatus for attaching a cover for an open topped vehicle enclosure, said enclosure having a plurality of side walls, each side wall including at least an outer wall portion and a top wall portion extending substantially horizontally and inwardly from said outer wall portion, said apparatus for attaching a cover comprising:
at least two rail members operably arranged in substantially parallel relationship upon opposite sides of said vehicle enclosure;
a plurality of discrete, separate attachment members, removably affixable to any of said at least two rail members for engaging a peripheral portion of a cover member;
a plurality of clamping members operably engageable with said side wall and said at least two rail members so as to grasp or release said side wall to clamp said at least two rail members onto said top wall portion of said side wall;
means for carrying cargo items, operably supported between said at least two rail members;
further clamping members operably engageable with said side wall and said at least two rail members;
at least two support bars, each having two ends, operably supported, in substantially parallel relation, substantially perpendicular to said at least two rail members, by said further clamping members; and
adapter means, operably mountable upon said further clamping members, for receiving and supporting said ends of said support bars.

* * * * *

UNITED STATES PATENT AND TRADEMARK OFFICE
CERTIFICATE OF CORRECTION

PATENT       :  5,261,719
DATED        :  November 16, 1993
INVENTOR(S)  :  David Tucker It is certified that error appears in the above-identified patent and that said Letters Patent is hereby corrected as shown below:

| | |
|---|---|
| Col. 6, line 58 | After "conditions" insert -- . --. |
| Col. 9, line 68 | Delete "affixed" and insert instead -- affixable --. |
| Col. 11, line 53 | Delete "cove" and insert instead -- cover--. |
| Col. 12, line 36 | Delete "and". |
| Col. 13, line 46 | Delete "cover" and insert instead -- corner --. |

Signed and Sealed this

Twenty-fifth Day of October, 1994

Attest:

BRUCE LEHMAN

*Attesting Officer*    *Commissioner of Patents and Trademarks*